(12) United States Patent
Wu et al.

(10) Patent No.: US 12,450,880 B2
(45) Date of Patent: Oct. 21, 2025

(54) TRAINING METHOD AND SYSTEM FOR NEURAL NETWORK MODEL

(71) Applicant: InSign Medical Technology (Hong Kong) Ltd., Hong Kong (CN)

(72) Inventors: Yi-Ta Wu, Hong Kong (CN); Kuang-Ting Hsiao, Hong Kong (CN)

(73) Assignee: InSign Medical Technology (Hong Kong) Ltd., Hong Kong (CN)

( * ) Notice: Subject to any disclaimer, the term of this patent is extended or adjusted under 35 U.S.C. 154(b) by 536 days.

(21) Appl. No.: 17/826,436

(22) Filed: May 27, 2022

(65) Prior Publication Data

US 2023/0326184 A1 Oct. 12, 2023

(30) Foreign Application Priority Data

Apr. 12, 2022 (CN) .......................... 202210378982.2

(51) Int. Cl.
*G06K 9/00* (2022.01)
*G06V 10/764* (2022.01)
*G06V 10/774* (2022.01)
*G06V 10/82* (2022.01)

(52) U.S. Cl.
CPC .......... *G06V 10/774* (2022.01); *G06V 10/764* (2022.01); *G06V 10/82* (2022.01)

(58) Field of Classification Search
CPC .... G06V 10/764; G06V 10/774; G06V 10/82; G06V 10/80; G06V 10/809; G06V 10/817; G06V 10/70; G06V 10/72
See application file for complete search history.

(56) References Cited

U.S. PATENT DOCUMENTS

| 2010/0183210 A1* | 7/2010 | Van Uitert | ............ | G06T 7/0012 |
| | | | | 382/131 |
| 2012/0008838 A1* | 1/2012 | Guyon | .................. | G16H 50/20 |
| | | | | 382/128 |
| 2012/0155757 A1* | 6/2012 | Wu | ...................... | G06V 40/161 |
| | | | | 382/165 |
| 2018/0089505 A1* | 3/2018 | El-Khamy | ............. | G06N 3/045 |

(Continued)

OTHER PUBLICATIONS

Hashemi, Mahdi. "Enlarging smaller images before inputting into convolutional neural network: zero-padding vs. interpolation." Journal of Big Data 6.1 (2019): 1-13. (Year: 2019).*

(Continued)

*Primary Examiner* — Avinash Yentrapati
(74) *Attorney, Agent, or Firm* — WPAT, PC

(57) ABSTRACT

A training method and a system for a neural network model where the method includes the following steps: receiving an image data; performing a convolution calculation by using the image data; performing a non-linear calculation by using the image data; and performing a classification process based on a first result of the convolution calculation and a second result of the non-linear calculation. The first result is generated in accordance with plural sums of products of the image data and a mask. The second result is generated in accordance with the image data, another mask, a mathematical operator, and a non-linear operator. The system includes an I/O interface configured for receiving an image data and a processor configured for performing a convolution calculation, a non-linear calculation, and a classification process.

1 Claim, 8 Drawing Sheets

(56) References Cited

U.S. PATENT DOCUMENTS

| | | | |
|---|---|---|---|
| 2019/0147305 A1* | 5/2019 | Lu | G06F 18/2413 |
| | | | 382/157 |
| 2020/0278408 A1* | 9/2020 | Sung | G06V 10/764 |
| 2021/0312635 A1* | 10/2021 | Price | G06T 7/194 |
| 2021/0390705 A1* | 12/2021 | Egertson | G06T 7/0012 |
| 2022/0237930 A1* | 7/2022 | Rando | G06V 10/764 |
| 2023/0030506 A1* | 2/2023 | Jaber | G06V 20/698 |
| 2023/0274404 A1* | 8/2023 | George | G06T 7/0002 |
| | | | 382/109 |
| 2024/0127433 A1* | 4/2024 | Du | G16H 50/20 |

OTHER PUBLICATIONS

Liu, Anan, et al. "Smooth filtering identification based on convolutional neural networks." Multimedia Tools and Applications 78 (2019): 26851-26865. (Year: 2019).*

\* cited by examiner

Fig. 8(c) Max = 165

|   | 0 | 1 | 2 | 3 | 4 | 5 | 6 | 7 | 8 |
|---|---|---|---|---|---|---|---|---|---|
| 0 | 255 | 255 | 255 | 255 | 255 | 255 | 255 | 255 | 255 |
| 1 | 255 | 165 | 165 | 166 | 166 | 166 | 163 | 162 | 255 |
| 2 | 255 | 165 | 165 | 166 | 166 | 166 | 163 | 162 | 255 |
| 3 | 255 | 167 | 165 | 43 | 43 | 43 | 163 | 163 | 255 |
| 4 | 255 | 167 | 167 | 43 | 43 | 43 | 166 | 166 | 255 |
| 5 | 255 | 167 | 167 | 43 | 43 | 43 | 166 | 166 | 255 |
| 6 | 255 | 166 | 167 | 170 | 174 | 174 | 174 | 170 | 255 |
| 7 | 255 | 164 | 167 | 170 | 174 | 174 | 174 | 170 | 255 |
| 8 | 255 | 255 | 255 | 255 | 255 | 255 | 255 | 255 | 255 |

Fig. 9(b)

| 255 | 255 | 255 |   | 20 | 20 | 20 |
|-----|-----|-----|---|----|----|----|
| 255 | 165 | 165 | − | 20 | 20 | 20 |
| 255 | 165 | 165 |   | 20 | 20 | 20 |

Fig. 9(c)

| 235 | 235 | 235 |
|-----|-----|-----|
| 235 | 145 | 145 | ➡ Min = 145
| 235 | 145 | 145 |

Fig. 9(d)

|   | 0 | 1 | 2 | 3 | 4 | 5 | 6 | 7 | 8 |
|---|---|---|---|---|---|---|---|---|---|
| 0 | 0 | 0 | 0 | 0 | 0 | 0 | 0 | 0 | 0 |
| 1 | 0 | 145 |   |   |   |   |   |   | 0 |
| 2 | 0 |   |   |   |   |   |   |   | 0 |
| 3 | 0 |   |   |   |   |   |   |   | 0 |
| 4 | 0 |   |   |   |   |   |   |   | 0 |
| 5 | 0 |   |   |   |   |   |   |   | 0 |
| 6 | 0 |   |   |   |   |   |   |   | 0 |
| 7 | 0 |   |   |   |   |   |   |   | 0 |
| 8 | 0 | 0 | 0 | 0 | 0 | 0 | 0 | 0 | 0 |

Fig. 9(e)

|   | 0 | 1 | 2 | 3 | 4 | 5 | 6 | 7 | 8 |
|---|---|---|---|---|---|---|---|---|---|
| 0 |   |   |   |   |   |   |   |   |   |
| 1 |   | 145 | 145 | 146 | 146 | 143 | 142 | 142 |   |
| 2 |   | 145 | 23 | 23 | 23 | 23 | 23 | 142 |   |
| 3 |   | 145 | 23 | 23 | 23 | 23 | 23 | 142 |   |
| 4 |   | 145 | 23 | 23 | 23 | 23 | 23 | 143 |   |
| 5 |   | 146 | 23 | 23 | 23 | 23 | 23 | 146 |   |
| 6 |   | 144 | 23 | 23 | 23 | 23 | 23 | 146 |   |
| 7 |   | 144 | 144 | 147 | 150 | 154 | 150 | 150 |   |
| 8 |   |   |   |   |   |   |   |   |   |

TRAINING METHOD AND SYSTEM FOR NEURAL NETWORK MODEL

RELATED APPLICATIONS

This application claims priority of China Patent Application No. 202210378982.2, by Wu et al., titled "TRAINING METHOD AND SYSTEM FOR NEURAL NETWORK MODEL" filed Apr. 12, 2022, which is hereby incorporated by reference in their entirety.

BACKGROUND OF THE INVENTION

Technical Field

This present disclosure relates to artificial intelligence that is implemented in neural network, and in particular, to training method and system for neural network model.

Description of Related Art

Computer learning is one of the major methods to implement artificial intelligence. In particular, computer learning and training based on algorithms constructed by neural networks have become the mainstream of implementations of artificial intelligence.

One of the widely used applications of artificial intelligence is image processing and recognition. First, a certain type of neural network model is trained by using some known and classified images. Then the trained neural network model can be used to classify unknown images. However, there still exists a need for making the neural network more sensitive to certain image features, so images with such subtle features can be detected.

SUMMARY

According to one aspect of the invention, a training method for a neural network model is provided. The method includes the following steps: receiving an image data; performing a convolution calculation by using the image data; performing a non-linear calculation by using the image data; and performing a classification process based on a first result of the convolution calculation and a second result of the non-linear calculation. The first result of the convolution calculation is generated in accordance with a plurality of sum of products of the image data and a mask, and the second result of the non-linear calculation is generated in accordance with the image data, another mask, a mathematical operator, and a non-linear operator.

In one embodiment, the training method further includes the following step: performing the convolution calculation more than once. The first result of a prior convolution calculation is regarded as the image data for performing a latter convolution calculation, and the classification process is performed based on the first result of each convolution calculation.

Further, each convolution calculation includes one of the following steps or any combination thereof: changing a dimension of the first result of the convolution calculation; and updating the first result of the convolution calculation based on an activation function.

In another embodiment, the training method further includes the following step: performing the non-linear calculation more than once. The second result of a prior non-linear calculation is regarded as the image data for performing a latter non-linear calculation, and the classification process is performed based on the second result of each non-linear calculation.

Further, each non-linear calculation includes one of the following steps of any combination thereof: changing a dimension of the second result of the non-linear calculation; and updating the second result of the non-linear calculation based on an activation function.

In a further embodiment, the step of performing the non-linear calculation further includes the following step: adding N circles of expansion data around the image data. N is a positive integer, and the expansion data is correspondingly determined by the non-linear operator.

Furthermore, the expansion data is the lowest value in a data range when the non-linear operator is set to acquire a maximum value, the expansion data is the highest value in the data range when the non-linear operator is set to acquire a minimum value, and the expansion data equals a value of the closest image data when the non-linear operator is set to acquire a mean value.

In yet another embodiment of the invention, the mathematical operator includes one of the following: addition, subtraction, multiplication, division, and power value.

In a further embodiment of the invention, the non-linear operator includes one of the following: acquiring a maximum value, acquiring a minimum value, and acquiring a mean value.

According to another aspect of the invention, a training system for a neural network model is provided. The training system includes: an I/O interface configured for receiving an image data; and a processor configured for performing a convolution calculation by using the image data, performing a non-linear calculation by using the image data, and performing a classification process based on a first result of the convolution calculation and a second result of the non-linear calculation. The first result is generated in accordance with a plurality of sum of products of the image data and a mask. The second result is generated in accordance with the image data, another mask, a mathematical operator, and a non-linear operator.

According to a further aspect of the invention, a training system for a neural network model is provided. The training system includes: a memory configured to store the neural network model; and a processor configured to perform a training method so as to train the neural network model. The training method includes the following steps: receiving an image data; performing a convolution calculation by using the image data; performing a non-linear calculation by using the image data; and performing a classification process based on a first result of the convolution calculation and a second result of the non-linear calculation. The first result is generated in accordance with a plurality of sum of products of the image data and a mask. The second result is generated in accordance with the image data, another mask, a mathematical operator, and a non-linear operator.

According to the embodiments of the invention, the training method and system for neural network model use deep learning to train linear and non-linear calculation parameters, so the image features obtained by the neural network model have higher degree of discrimination, which is beneficial to the subsequent classification calculation process. Moreover, the neural network model established therefrom is more sensitive to certain image features, and the images with these subtle features can be detected more accurately.

BRIEF DESCRIPTION OF DRAWINGS

The invention can be more fully understood by reading the following detailed description of the embodiment, with reference made to the accompanying drawings as follows:

FIG. 7(a) is a schematic diagram showing one example of the input image;

FIG. 7(b) is a schematic diagram showing the mask used in step 520 according to one embodiment of the invention;

FIG. 7(c) is a schematic diagram showing the mask used in step 620 according to one embodiment of the invention;

FIG. 8(a) is a schematic diagram showing the padded image;

FIG. 8(b) is a schematic diagram showing the calculation at location Img(1,1) in step 620;

FIG. 8(c) is a schematic diagram showing the calculation result based on mathematical operator and non-linear operator;

FIG. 8(d) is a schematic diagram showing the value is input in the location Img(1,1);

FIG. 8(e) is a schematic diagram showing all locations of the image data that have been processed; and FIGS. 9(a)-9(e) are schematic diagrams of the non-linear calculation process according to another embodiment of the invention.

DETAILED DESCRIPTION

Figure 1:
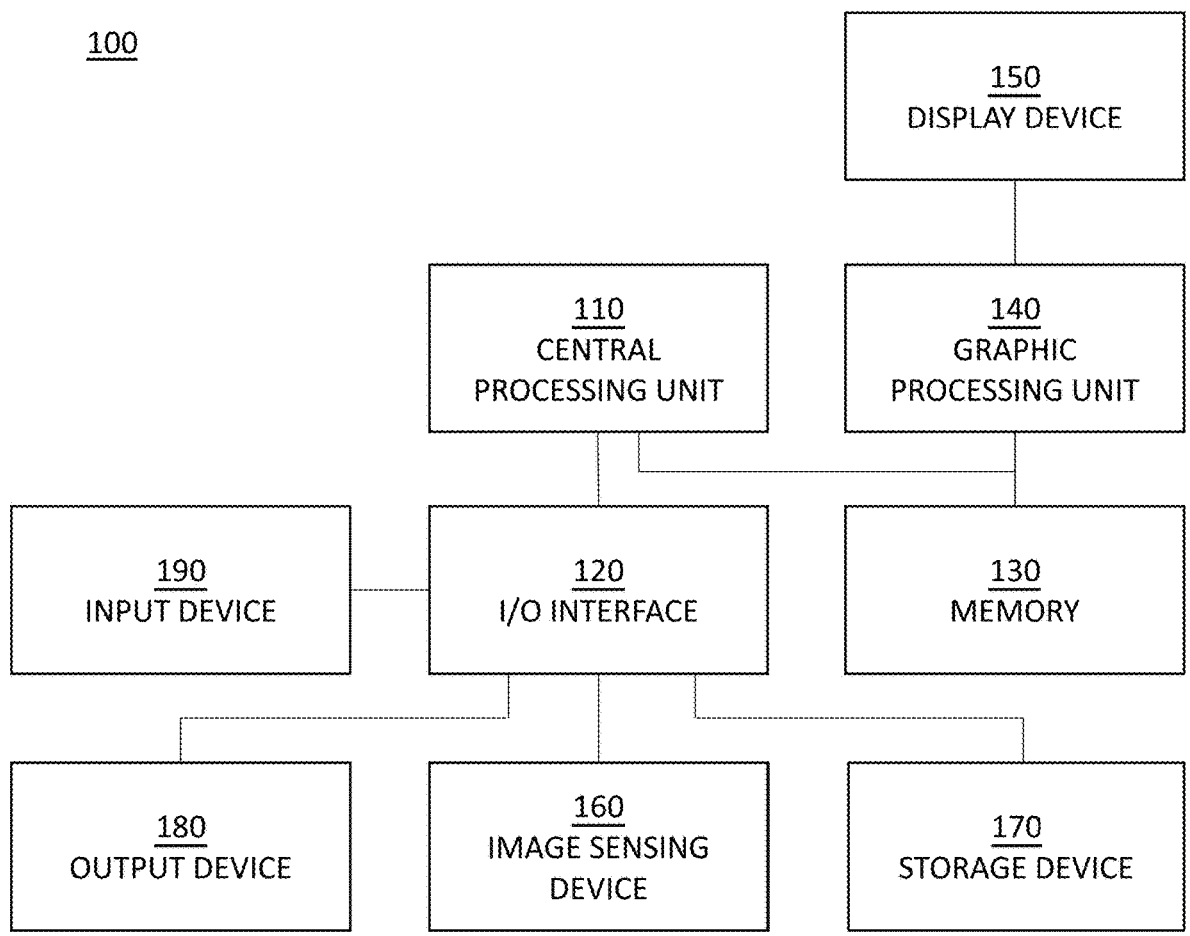
FIG. 1 is a block diagram of a neural network training system 100 according to one embodiment of present application.

The present disclosure will now be described more fully hereinafter with reference to the accompanying drawings, in which exemplary embodiments of the disclosure are shown. This disclosure may, however, be embodied in many different forms and should not be construed as limited to the exemplary embodiments set forth herein. Rather, these exemplary embodiments are provided so that this disclosure will be thorough and complete, and will fully convey the scope of the disclosure to those skilled in the art. Like reference numerals refer to like elements throughout.

The terminology used herein is for the purpose of describing particular exemplary embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Please refer to FIG. 1, which is a block diagram of a neural network training system 100 according to one embodiment of present application. The neural network training system 100 includes a central processing unit 110, which is configured to run an operating system so as to control the operations of the neural network training system 100. The present application does not limit the instruction set used by the central processing unit 110, nor the operating system used by it. For instance, the central processing unit 110 includes one or more processing chips, and each processing chip can include one or more processing cores. The instruction set used by the processing core may include arithmetic and logic operations, and in another embodiment, it may include specific vector instructions which is specialized for processing neural networks.

The neural network training system 100 includes an I/O interface 120, which is configured for connecting to a variety of output devices 180 and input devices 190. For example, the output devices 180 include speaker, buzzer, and/or light, which is used for notifying or alerting user. The input devices 190 include, for instance, keyboard, mouse, track ball, touch pad, scanner, and/or microphone, which is used for inputting outside messages to the neural network training system 100. The I/O interface 120 can further connect to wired or wireless network device, commonly refer to device that complies with Bluetooth WiFi, IEEE 802.3, 4G or 5G communication regulations.

The I/O interface 120 can be used to connect to image sensing device 160 and/or storage device 170. The image sensing device 160 exemplarily includes video or image sensing component for picking up lights across various spectrums. The image sensing device 160 includes a buffer memory for caching the detected images and later sending them to the central processing unit 110 and/or a memory 130. In one embodiment, the image sensing device 160 can be endoscope, and the storage device 170 can be traditional floppy disc drive, optical disc drive, hard disc drive, or solid-state drive. In one embodiment, the image sensing device 160 and the storage device 170 are integrated in one device.

The memory 130 can include multiple stages of memory, such as the hierarchy of dynamic random access memory and static random access memory. The memory 130 is used for store instructions and data, such as the aforementioned operating system and applications usable on the operating system. In one embodiment, the memory 130 can also store the neural network model provided by the embodiments of the present application.

In one embodiment, the neural network training system 110 includes graphic processing unit 140. The central processing unit 110 and the graphic processing unit 140 can share the memory 130 and transmit a large amount of data through the memory 130. The central processing unit 110 and the graphic processing unit 140 can also be regarded as one integrated processor. One the other hand, the processor of the neural network training system 110 may include the central processing unit 110 and/or the graphic processing unit 140. The processing resource of the graphic processing unit 140 also facilitates the realization of the neural network algorithm provided by the embodiments of the present application. Further, the neural network training system 100 includes a display device 150 which connects to the graphic processing unit 140. The display device 100 is configured to display images before and after processing.

In one embodiment, the neural network training system 100 can further include a specific acceleration expansion circuit module for accelerating the calculation process used in the neural network of the present application. One skilled in the related art should have ordinary knowledge of computer organization and computer architecture, so he/she would understand the hardware configuration of the neural network training system 100.

Figure 2:
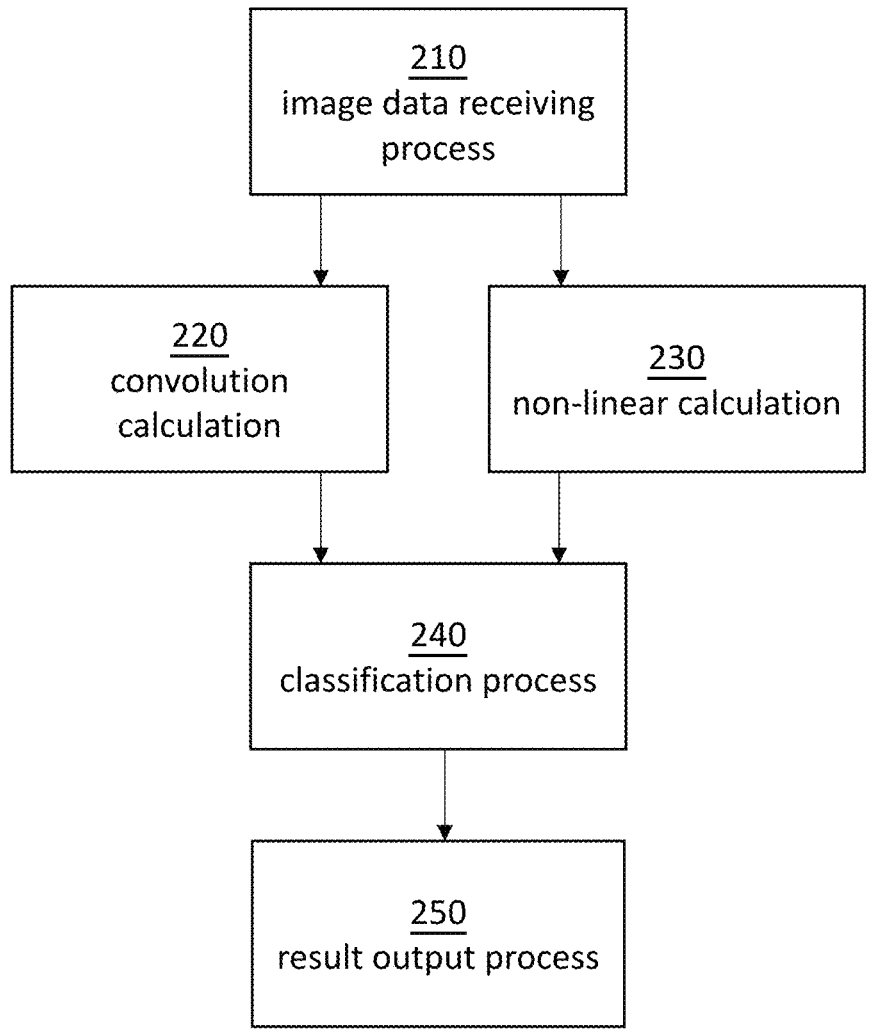
FIG. 2 is a flow chart of a neural network training method 200 according to one embodiment of the present application.

Please refer to FIG. 2, which is a flow chart of a neural network training method 200 according to one embodiment of the present application. The neural network training method 200 can be implemented by the neural network training system 100 as elaborated in the above with FIG. 1. In one embodiment, one of the central processing unit 110, the graphic processing unit 140, and specific acceleration expansion circuit module or any combination thereof can execute multiple instructions to realize the neural network training method 200. The neural network training method 200 is based on a data structure of a neural network model. One skilled in the related art should have ordinary knowledge of computer neural network model, so he/she would understand that the computer neural network model includes multiple layers, and each layer includes multiple nodes. The nodes on two different layers have links between them, and each link has one or more trainable weight parameters. While training the neural network model, it is the weight parameters that are to be trained until the convergence of the model is reached. The neural network training method 200 begins with step 210.

In step 210, an image data is received. In one embodiment, the image data came from the image sensing device 160. In another embodiment, it came from the storage device 170. The method continues to step 220 and step 230. The order of performing step 220 and step 230 is not limited in the present application since the two steps can be processed in parallel.

In step 220, a convolution calculation is performed by using the image data. The content of the convolution calculation will be further detailed later with FIG. 3 and FIG. 5. The convolution calculation generates one or more convolution results (also refer to as the first results). At least one of the convolution results is sent to step 240.

In step 230, a non-linear calculation is performed by using the image data. The content of the non-linear calculation will be further detailed later in accompany with FIG. 4 and FIG. 6. The non-linear calculation generates one or more non-linear calculation results (also refer to as the second results). At least one of the non-linear calculation results is sent to step 240.

In step 240, a classification process is performed based on at least one of the first result of the convolution calculation and at least one of the second result of the non-linear calculation. In the classification process, the input data can be flattened first and then input into a traditional non-convolutional neural network. The traditional non-convolutional neural network includes more than one fully connected layer, hidden layer, and output layer.

In step 250, the outcome of the output layer of the traditional convolution neural network is provided.

At least one feature of the neural network training method 200 of the present application is that the convolution calculation 220 and the non-linear calculation 230 are provided at the same time, which provides different forms of filter expressions in two categories, namely linear and non-linear. Thus, the neural network training method 200 provides more profound filter expressions, and more subtle features can be learnt through linear and non-linear filtering calculations. While utilizing the neural network model trained from the neural network training method 200, more subtle features can be found. For example, based on the medical images obtained from gastroscopy, colonoscopy, colposcopy, and angioscopy, the detection rate of initial lesions can be improved. Moreover, while conducting non-intrusive inspection on tissues, organs, or industrial parts, such as X-ray imaging and ultrasonic imaging, the location of a disease or the defect in a material can be detected more easily.

Figure 3:
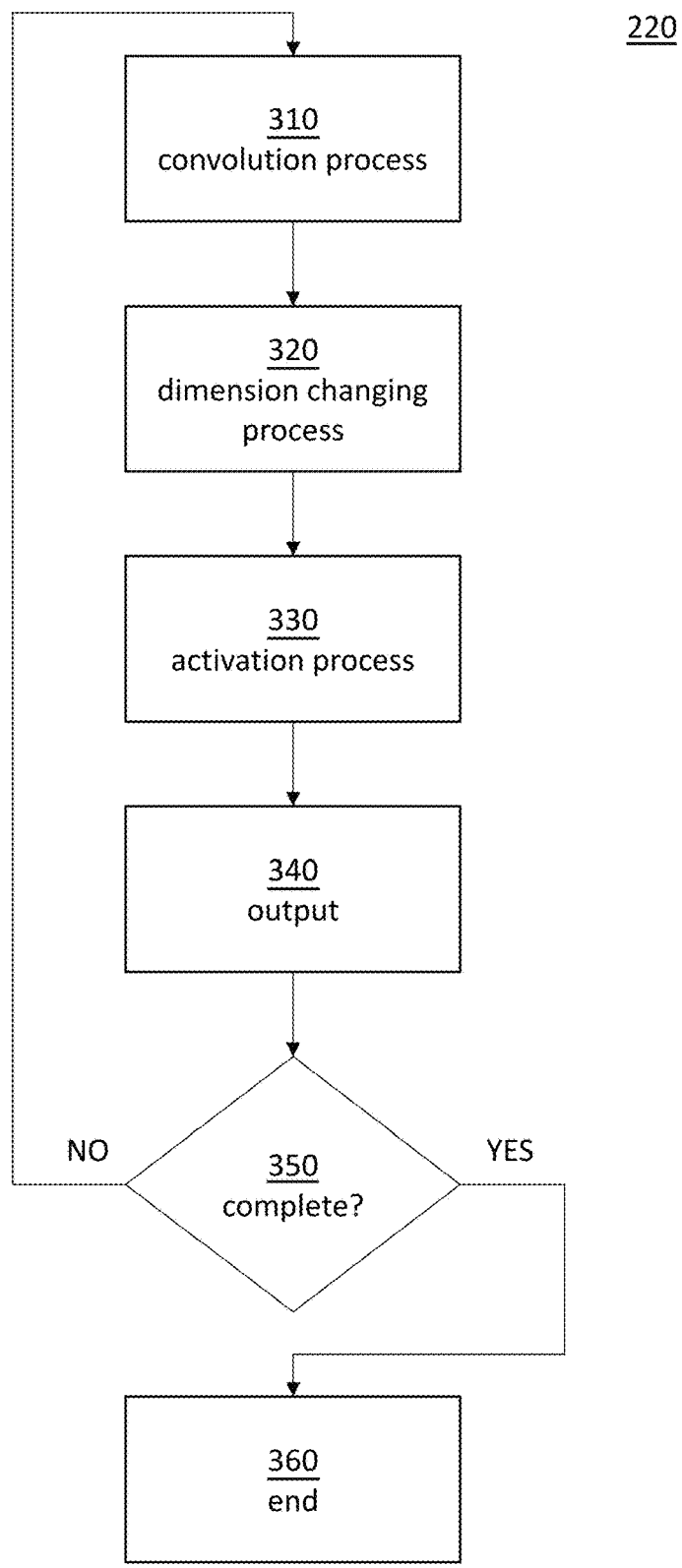
FIG. 3 is a flow chart of the convolution calculation 220 according to one embodiment of the invention.

Please refer to FIG. 3, which is a flow chart of the convolution calculation 220 according to one embodiment of the invention. The implementation conditions of the convolution calculation 220 are the same as the neural network training method 200 as shown in FIG. 2, their detail would not be repeated. The convolution calculation 220 begins with step 310.

In step 310, a convolution process 310 is performed based on the input image data. In the convolution process 310, a mask smaller than the size of the image data is used to slide pixel by pixel across the image data. A pixel value in the image data is calculated through a sum of products operation according to the mask, and thus a convolution result is generated therefrom. The exemplarily embodiment of the convolution process 310 will be elaborated later with FIG. 5. After step 310, an optional step 320, an optional step 330 or step 340 is performed.

In optional step 320, a dimension of the convolution result is changed. For example, a rectified linear unit is used to change the dimension of the input convolution result. Next, optional step 330 or step 340 is performed.

In optional step 330, the convolution result is updated based on an activation function. For example, a hyperbolic tangent function or a sigmoid function or their like is used to increase the nonlinearity of the convolution result. Next, the process flow moves on to step 340.

In step 340, the processed convolution result is sent to the aforementioned step 240 as input.

In step 350, whether the convolution calculation 220 is completed is determined. The number of loops of executing the convolution calculation 220 can be predetermined in accordance with different applications. Therefore, the current calculation result can be sent back to step S310 to repeat the convolution process until the predetermined number of the loops is reached, and then the method can move on to step 360. Each loop of the calculation may include the optional step 320 or step 330. For example, a convolution calculation 220 having 4 loops of calculations is provided. In the first loop of calculation, step 320, step 330, and step 340 are included. In the second loop, only step 320 is included. In third loop, step 320 and step 330 are included. In the fourth loop, step 320 and step 340 are included.

In step 360, the convolution calculation 220 is ended.

Figure 4:
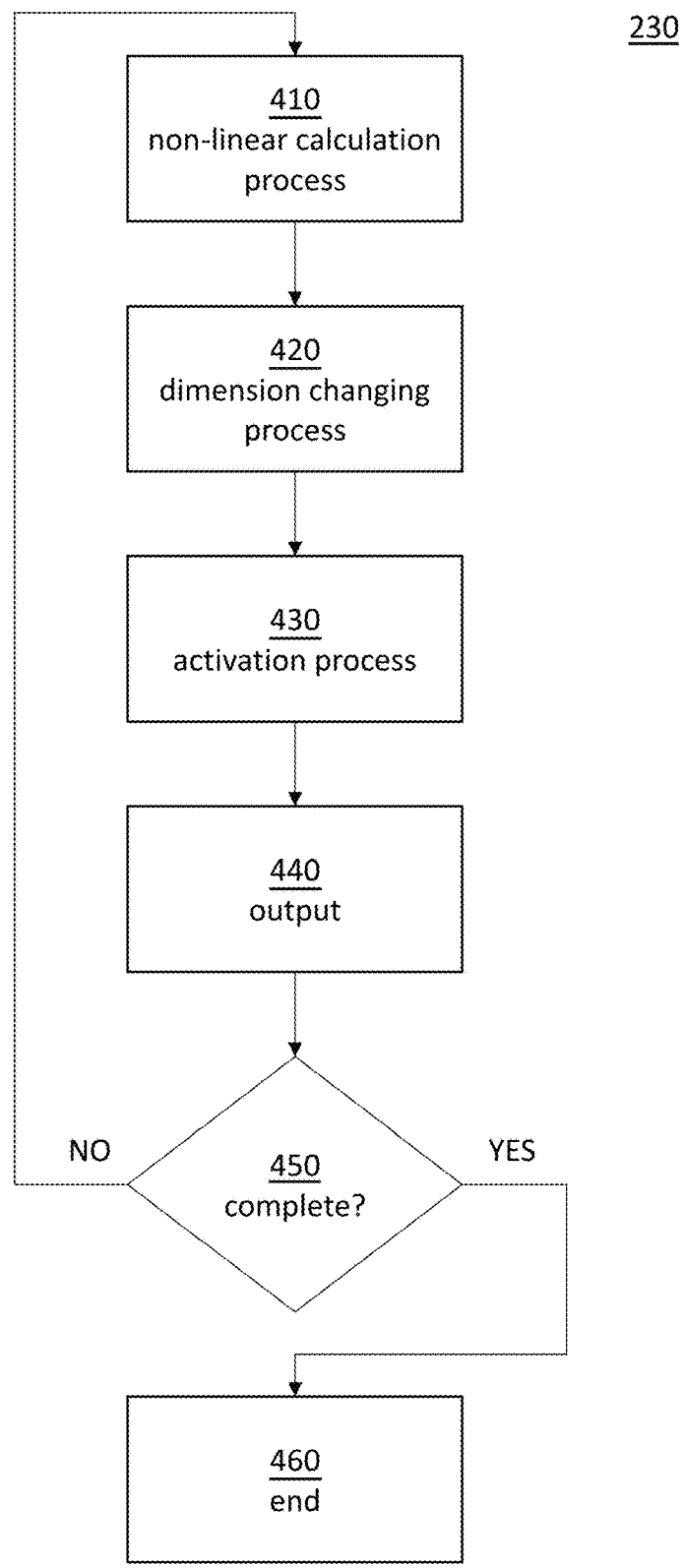
FIG. 4 is a flow chart of a non-linear calculation 230 according to one embodiment of the invention.

Please refer to FIG. 4, which is a flow chart of a non-linear calculation 230 according to one embodiment of the invention. The implementation conditions of the non-linear calculation 230 are the same as the neural network training method 200 as shown in FIG. 2, their detail would not be repeated. The non-linear calculation begins with step 410.

In step 410, a non-linear calculation process 410 is performed based on the input image data. In the non-linear calculation process 410, similar to that in the convolution process 310, a mask smaller than the size of the image data is used to slide pixel by pixel across the image data. An operation specified by a mathematical operator is performed on each pixel value in the image data. Then, a non-linear calculation is performed on the operation result by using a non-linear operator to generate a calculation result. The embodiment of the non-linear calculation process 410 will be elaborated in more detail later with FIG. 6. The mathematical operator is not necessary multiplication, it can also be addition, subtraction, division, or power value. The present invention is not limited thereto. The process then continues to the optional step 420, optional step 430, or step 440.

In the optional step 420, a dimension of the non-linear calculation result is changed. For example, a rectified linear unit is used to change the dimension of the input non-linear calculation result. Next, the optional step 430 or step 440 is performed.

In the optional step 430, the non-linear calculation result is updated based on an activation function. For example, a hyperbolic tangent function or a sigmoid function or their like is used to increase the nonlinearity of the non-linear calculation result. Next, the process flow moves on to step 440.

In step 440, the non-linear calculation result is sent to the aforementioned step 240 as input.

In step 450, whether the non-linear calculation 230 is completed is determined. The number of loops of executing the non-linear calculation 230 can be predetermined in accordance with different applications. Therefore, the current calculation result is sent back to step 410 to repeat the non-linear calculation process until the predetermined number of the loops is reached, and then the method can move on to step 460. Each loop of the calculation may include the optional step 420 or step 430. For example, a non-linear calculation 230 having 4 loops of calculation is provided. In the first loop of calculation, step 430, step 430, and step 440 are included. In the second loop, only step 420 is included. In the third loop, step 420 and step 430 are included. In the fourth loop, step 420 and step 440 are included.

In step 460, the non-linear calculation 230 is ended.

Figure 5:
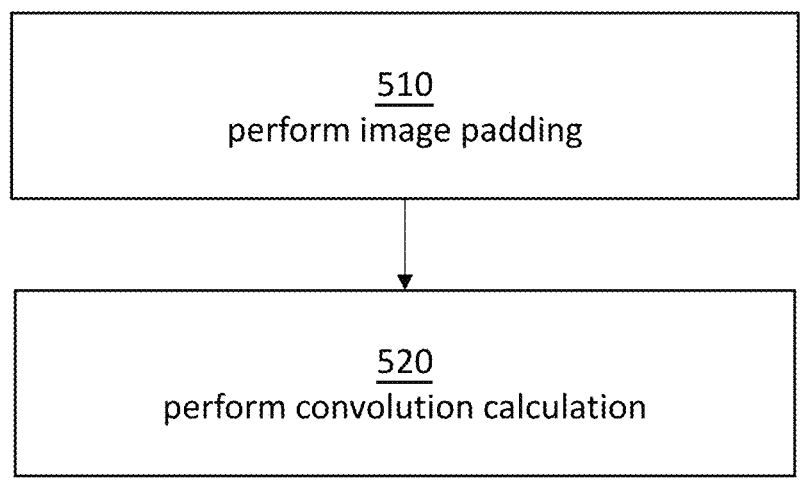
FIG. 5 is a flow chart of the convolution process 310 according to one embodiment of the invention.

Please refer to FIG. 5, which is a flow chart of the convolution process 310 according to one embodiment of the invention. The implementation conditions of the convolution process 310 are the same as the neural network training method 200 as shown in FIG. 2, their detail would not be repeated. The convolution process 310 begins with the optional step 510; alternatively, it can also begin with step 520.

In the optional step 510, a step of image padding is performed. Since the image size will be reduced in the following convolution step 520, the image can be firstly expanded with N row(s) at the top, N row(s) at the bottom, N column(s) at the left, and N column(s) at the right. In this manner, the image can maintain its original size after the operation in step 520. In other words, N circle(s) of expansion data is added around the image data, and then the value "0" is input into the rows and columns (or the circles) of the expansion data. N is a positive integer. Other embodiments of the invention also allow the increment in the size of the image after convolution.

In step 520, a mask smaller than the size of the image data is used to slide across the image data based on strides. A pixel value in the image data is calculated through a sum of products operation according to the mask, and thus a convolution result is generated. For example, when the mask is a 3×3 matrix with nine mask values, a target pixel value in the image data and its eight neighboring pixel values are acquired, that is, a total number of nine pixel values are acquired. Then the nine pixel values are respectively multiplied by nine mask values in corresponding locations, resulting in nine products. The sum of the nine products is then input into a corresponding location in the convoluted image data. The mask moves to the next target pixel by a stride, and the operation repeats. After all the pixels in the image data have completed the above-mentioned operation, all the pixel values of the convoluted image data can be acquired.

Figure 6:
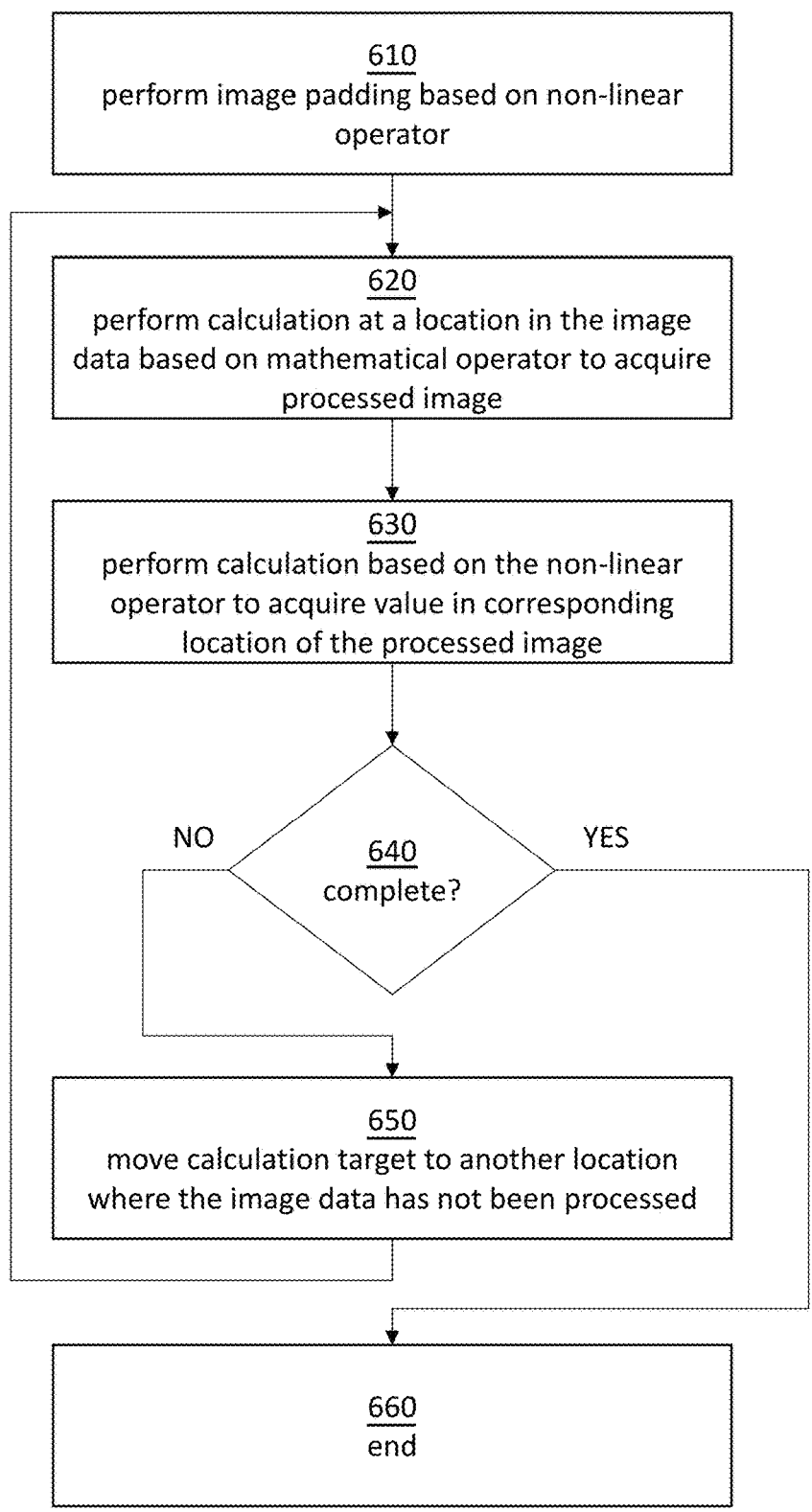
FIG. 6 is a flow chart of the non-linear calculation process 410 according to one embodiment of the invention.

Please refer to FIG. 6, which is a flow chart of the non-linear calculation process 410 according to one embodiment of the invention. The implementation conditions of the non-linear calculation process 410 are the same as the neural network training method 200 as shown in FIG. 2, their detail would not be repeated. The non-linear calculation process 410 includes four input factors: the input image data, the mask, the mathematical operator (IM-Operator), and the non-linear operator (NL-Operator). The non-linear calculation process 410 begins with step 610; or alternatively begins with step 620.

Assuming the input image size is m×n, the input image can be represented as a 2-dimensional matrix (Img). The pixel value in the xth row and the yth column is Img(x,y), in which 1<=x<=m, 1<=y<=n, and x, y, m, and n are all integers. Assuming the size of the mask is a×b, the mask can also be represented as a 2-dimensional matrix (Mask). The mask value in the xth row and yth column is Mask(x,y), in which 1<=x<=a, 1<=y<=b, and x, y, a, and b are all integers. The IM-Operator includes one of the following: addition, subtraction, multiplication, division, and power value. The NL-Operator includes one of the following: acquiring a maximum value (max), acquiring a minimum value (min), and acquiring a mean value (avg). In one embodiment, the non-linear calculation (NLD) can be expressed by the following formula (1).

$$NLD(Img, Mask, IM-\text{Operator}, NL-\text{Operator})(x, y) = \tag{1}$$
$$NL-\text{Operator}_{i \in Ma, j \in Mb}(Img(x-i, y-j)[IM-\text{Operator}] Mask(i, j))$$

In the optional step 610, a step of image padding is performed. Since the image size will be reduced in the following calculation step 620, the image can be firstly expanded with N row(s) at the top, N row(s) at the bottom, N column(s) at the left, and N column(s) at the right. N is a positive integer. In this manner, the image can maintain the original size after the operation in step 620. In other words, N circle(s) of expansion data is added around the image data, and then values are correspondingly input into the rows and columns (or the circles) of the expansion data based on the NL-Operator. Other embodiments of the invention also allow the increment in size of the image data after calculation.

In one embodiment, when the NL-Operator is set to acquire the maximum value (max), the value input in the expansion data is the minimum value of the image data. For example, when the value of the image data ranges from 0 to 255, the input value is 0. When the NL-Operator is set to acquire the minimum value (min), the value input in the expansion data is the maximum value of the image data. For example, when the value of the image data ranges from 0 to 255, the input value is 255. In another embodiment, when the NL-Operator is set to acquire the mean value (avg), the input value equals the nearest pixel value in the image data. In yet another embodiment, when the value of the image data ranges from 0 to 255, the input value is the median number, e.g. 127. In an alternative embodiment, the input value is the average of more than one nearest pixel values in the image data.

Please refer to 7(a), which is one example of the input image, whose size is 7×7. Please also refer to FIG. 8(a), which is the padded image of the input image of FIG. 7(a) after step 510 or step 610. Since one circle of the expansion data is added outside the input image data, the padded image of FIG. 8(a) has a size of 9×9. The input value in the outmost circle is 0. According to above description, the input value of step 510 can be the minimum pixel value in the image data. The input value of step 610 is determined according to the NL-Operator and the input image data.

Figures 7A, 7B, 7C, 8A, 8B, 8C, 8D, 8E:
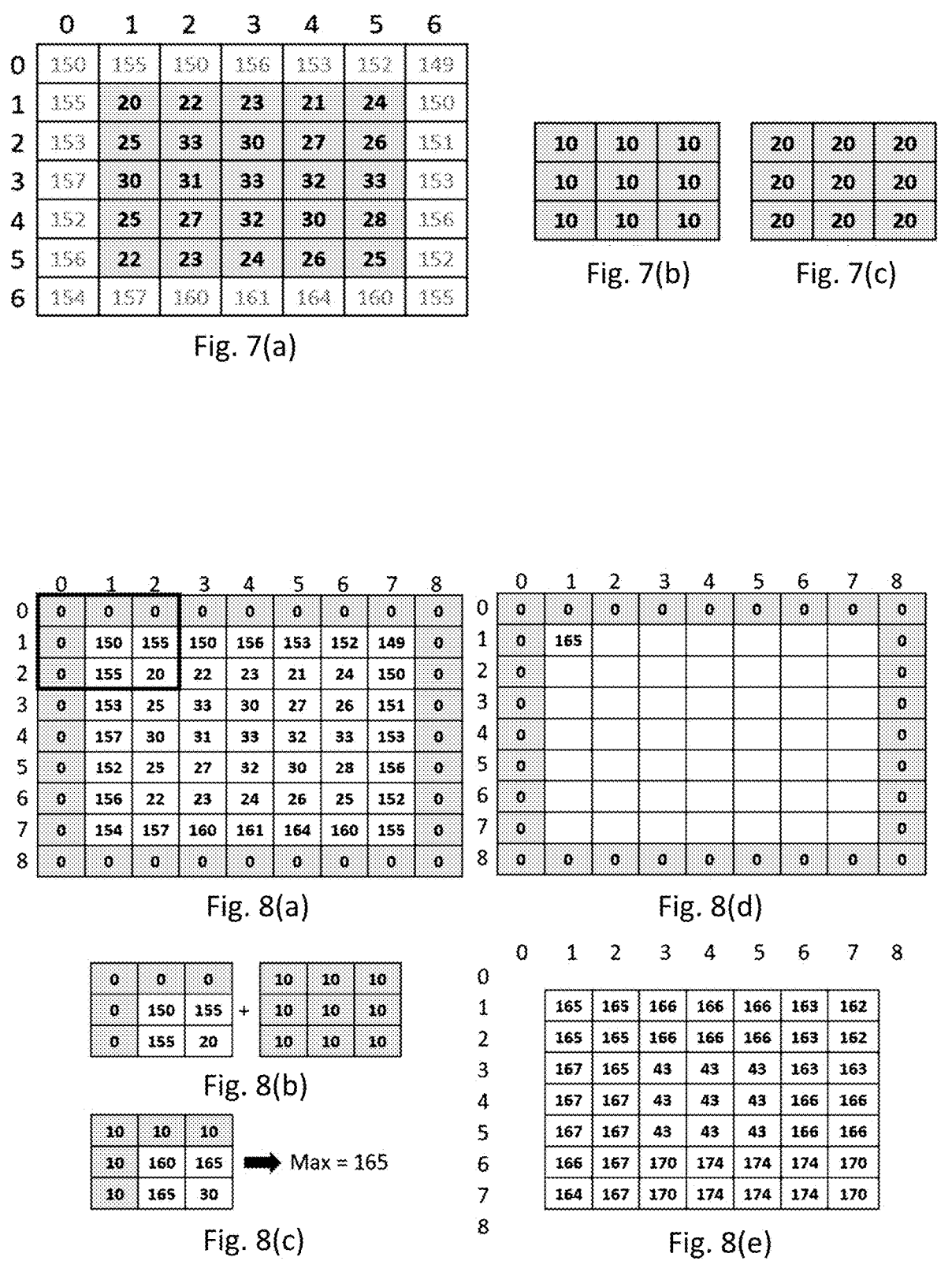

Please refer to FIG. 7(b), which is the mask used in step 520 according to one embodiment of the invention. Please refer to FIG. 7(c), which is the mask used in step 620 according to one embodiment of the invention.

In step 620, a calculation is performed at a location in the image data based on the mathematical operator (IM-Operator) to acquire the processed image data. The location indicates a target pixel in the image data for calculation. The mask of FIG. 7(b) and the padded image of FIG. 8(a) are taken as examples to perform the calculation based on the mathematical operator (IM-Operator). In the embodiments shown in FIG. 8(a) to FIG. 8(e), the factors in formula (1) are specified as NLD(Img, Mask, Add, Max), so as to conduct the calculation. The mathematical operator (IM-Operator) is set to "add" and the non-linear operator (NL-Operator) is set to "acquire the maximum value". Please refer to FIG. 8(b), which is a schematic diagram showing the calculation at location Img(1,1) in step 620. When conducting the calculation at location Img(1,1), there are nine addition operations in total. The calculation result is shown in FIG. 8(c), the table in the left is the calculation result at the location Img(1,1) in step 620.

In step 630, another calculation based on the non-linear operator (NL-Operator) is applied to the calculated image data after step 620, so that the value at the corresponding location of the outcome image data can be acquired. For example, in the embodiment shown in FIG. 8(c), the maximum value in the left table is 165. As shown in FIG. 8(d), the value at location Img(1,1) of the outcome image data is then input with 165, which is the result of the non-linear calculation as shown in FIG. 8(c).

In step 640, whether all the image data have been processed or not is determined. When all the pixel values of the image data have been processed, the method continues to step 660; or otherwise continues to step 650.

In step 650, the calculation target (which indicates the pixel that currently undergoes calculation) is moved to another location where the pixel has not been processed, and then the method returns to step 620.

In step 660, the non-linear calculation process 410 is ended. Please refer to FIG. 8(e), which is the schematic diagram showing step 660, where all the pixel values of the image data have been processed through the non-linear calculation step 410. FIG. 8(e) shows the outcome image data.

The non-linear calculation process 410 shown in FIG. 6 is performed sequentially. After one location in the image data is processed, the calculation target is moved to the next location (i.e. another pixel in the image data). However, one skilled in the related art would understand that in yet another embodiment, the non-linear calculation process 410 of FIG. 6 can be modified to be performed in parallel. For example, step 620 can be modified to perform mathematical operations on all pixels at the same time, and the step 630 can be modified to perform non-linear calculation on all pixels at the same time. As long as the amount of the logic circuit and the memory circuit is sufficient, the non-linear calculation process 410 can be accelerated.

Please refer to FIG. 9(a) to FIG. 9(e), which show the schematic diagrams of the non-linear calculation process 410 according to another embodiment of the invention. In this embodiment, the factors in the formula (1) are specified as NLD(Img, Mask, Subtract, Min). The mathematical operator (IM-Operator) is set to "subtract" and the non-linear operator (NL-Operator) is set to "acquire the minimum value". In step 610, the input value is the maximum value 255 of the range 0-255 when the non-linear operator indicates acquiring the minimum value. A mathematical operation process of step 620 is shown in FIG. 9(b). The nine values of the mask are respectively subtracted from the corresponding nine values relating to location Image(1,1), and the result is shown in the left table of FIG. 9(c). A non-linear calculation of step 630 is shown in FIG. 9(c), where the minimum value—145 of the nine values is acquired. Then, as shown in FIG. 9(d), this value is input into the location of Img(1,1). Finally, after 7×7=49 times of the process, the result is shown in FIG. 9(e), which shows the outcome image data.

According to one embodiment of the invention, a training method for a neural network model is provided. The method includes: receiving an image data; performing a convolution calculation by using the image data; performing a non-linear calculation by using the image data; and performing a classification process based on a first result of the convolution calculation and a second result of the non-linear calculation. The first result of the convolution calculation is generated in accordance with plural sums of products of the image data and a mask, and the second result of the non-linear calculation is generated in accordance with the image data, another mask, a mathematical operator, and a non-linear operator.

Preferably, in order to perform more than one calculation loops, the method further includes: performing the convolution calculation more than once. The first result of a prior convolution calculation is regarded as the image data for performing a latter convolution calculation, and the classification process is performed based on the first result of each convolution calculation.

Preferably, in order to perform more than one calculation loops, the method further includes: performing the non-linear calculation more than once. The second result of a prior non-linear calculation is regarded as the image data for performing a latter non-linear calculation, and the classification process is performed based on the second result of each non-linear calculation.

Preferably, in order to provide computational flexibility, save the resources, and improve non-linear performance, each convolution calculation includes one of the following steps or any combination thereof: changing a dimension of the first result of the convolution calculation; and updating the first result of the convolution calculation based on an activation function.

Preferably, in order to provide computational flexibility, save the resources, and improve non-linear performance, each non-linear calculation comprises one of the following steps of any combination thereof: changing a dimension of the second result of the non-linear calculation; and updating the second result of the non-linear calculation based on an activation function.

Preferably, in order to maintain the image size after the non-linear calculation, the step of performing the non-linear calculation further includes: adding N circles of expansion data around the image data. N is a positive integer, and the expansion data is correspondingly determined by the non-linear operator.

Preferably, in order to make the input data conform with the operation characteristic of the non-linear calculation, the expansion data is the lowest value in a data range when the non-linear operator is set to acquire a maximum value. The expansion data is the highest value in the data range when the non-linear operator is set to acquire a minimum value. The expansion data equals a value of the closest image data when the non-linear operator is set to acquire a mean value.

In one example, in order to express the nonlinearity, the mathematical operator includes one of the following: addition, subtraction, multiplication, division, and power value.

Preferably, in order to express the nonlinearity, the non-linear operator includes one of the following: acquiring a maximum value, acquiring a minimum value, and acquiring a mean value.

According to another embodiment of the invention, a training system for a neural network model is provided. The system includes: an I/O interface configured for receiving an image data; and a processor configured for performing a convolution calculation by using the image data, performing a non-linear calculation by using the image data, and performing a classification process based on a first result of the convolution calculation and a second result of the non-linear calculation, wherein the first result is generated in accordance with a plurality of sum of products of the image data and a mask, and the second result is generated in accordance with the image data, another mask, a mathematical operator, and a non-linear operator.

According to yet another embodiment of the invention, a training system for a neural network model is provided. The system includes: a memory configured to store the neural network model; and a processor configured to perform a training method so as to train the neural network model. The training method includes the following steps: receiving an image data; performing a convolution calculation by using the image data; performing a non-linear calculation by using the image data; and performing a classification process based on a first result of the convolution calculation and a second result of the non-linear calculation. The first result is generated in accordance with a plurality of sum of products of the image data and a mask, and the second result is generated in accordance with the image data, another mask, a mathematical operator, and a non-linear operator.

The training method and system for neural network model provided in the above-mentioned embodiments are used for training the linear and non-linear calculation parameters through deep learning. As a result, the features obtained by the neural network model have higher degree of discrimination, which is beneficial to the subsequent operations like classification. The neural network model trained therefrom is more sensitive to certain features and can detect images with these subtle features more easily.

The ordinal numbers used in the detailed description and claims, such as "first" and "second", do not necessarily indicate their priority orders or up and down directions; on the contrary, they are merely intended to distinguish different elements. It will be apparent to those skilled in the art that various modifications and variations can be made to the structure of the present invention without departing from the scope or spirit of the invention. In view of the foregoing, it is intended that the present invention covers modifications and variations of this invention, provided they fall within the scope of the following claims.

What is claimed is:

1. A training method for a neural network model, comprising:
   receiving an image data;
   performing a convolution calculation by using the image data;
   performing a non-linear calculation by using the image data, comprising:
      adding N circles of expansion data around the image data, wherein N is a positive integer, and the expansion data is correspondingly determined by the non-linear operator; and
   performing a classification process based on a first result of the convolution calculation and a second result of the non-linear calculation;
   wherein, the first result of the convolution calculation is generated in accordance with a plurality of sums of products of the image data and a mask, and the second result of the non-linear calculation is generated in accordance with the image data, another mask, a mathematical operator, and a non-linear operator;
   wherein the expansion data is the lowest value in a data range when the non-linear operator is set to acquire a maximum value, the expansion data is the highest value in the data range when the non-linear operator is set to acquire a minimum value, and the expansion data equals a value of the closest image data when the non-linear operator is set to acquire a mean value.

* * * * *